Oct. 27, 1959    S. A. GRUBISH    2,910,289
METAL CUTTING AND WELDING MACHINE
Filed July 12, 1957    7 Sheets-Sheet 1

INVENTOR.
STEPHEN A. GRUBISH
BY Williams & Jillson
ATTORNEYS

INVENTOR.
STEPHEN A. GRUBISH
BY
Williams & Tilbury
ATTORNEYS

Oct. 27, 1959 S. A. GRUBISH 2,910,289
METAL CUTTING AND WELDING MACHINE
Filed July 12, 1957 7 Sheets-Sheet 5

INVENTOR.
STEPHEN A. GRUBISH
BY
*Williams & Tilbury*
ATTORNEYS

Oct. 27, 1959 S. A. GRUBISH 2,910,289
METAL CUTTING AND WELDING MACHINE
Filed July 12, 1957 7 Sheets-Sheet 6
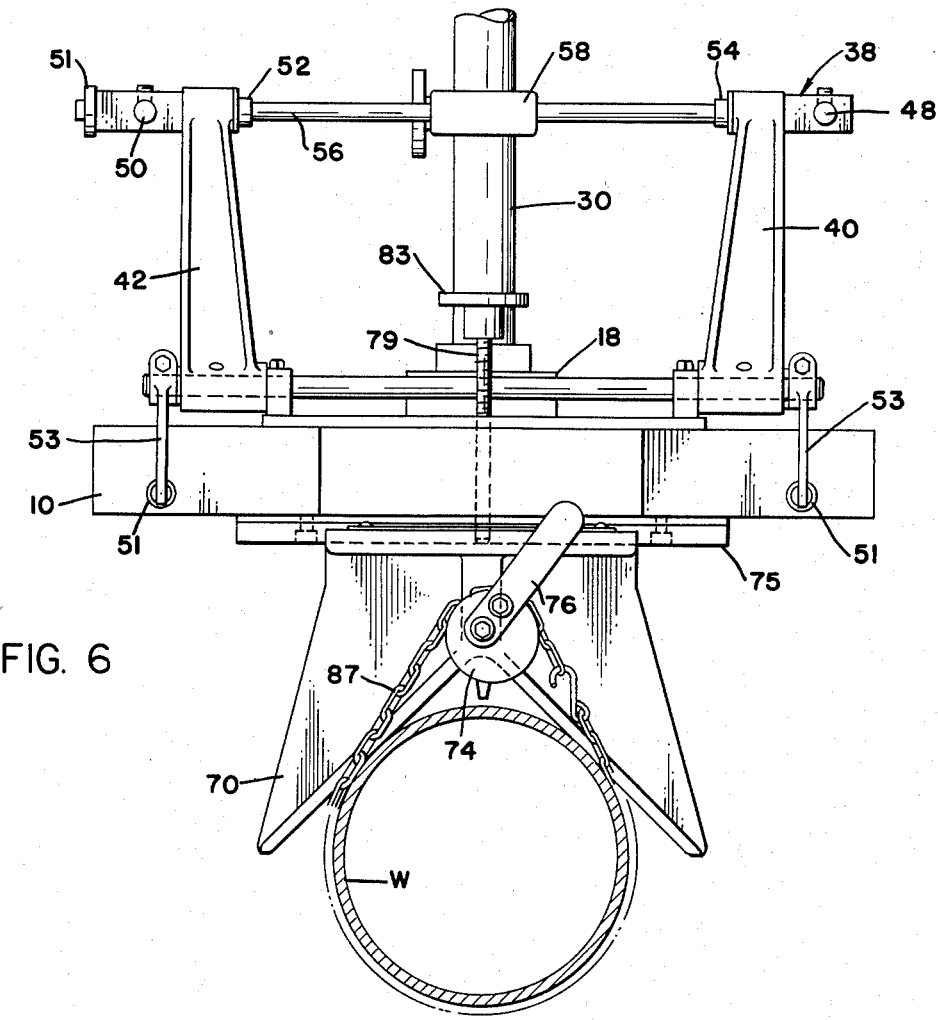
FIG. 6
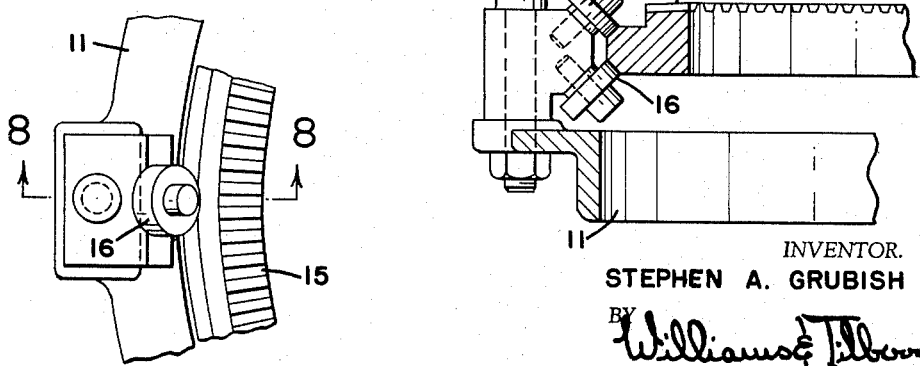
FIG. 7
FIG. 8
INVENTOR.
STEPHEN A. GRUBISH
BY Williams & Tilbury
ATTORNEYS Oct. 27, 1959

S. A. GRUBISH 2,910,289

METAL CUTTING AND WELDING MACHINE

Filed July 12, 1957

*INVENTOR.*
STEPHEN A. GRUBISH

BY *Williams & Tilbury*

ATTORNEYS

United States Patent Office 2,910,289
Patented Oct. 27, 1959

2,910,289

METAL CUTTING AND WELDING MACHINE

Stephen Anthony Grubish, Salem, Ohio

Application July 12, 1957, Serial No. 671,445

6 Claims. (Cl. 266—23)

This invention relates to apparatus for cutting and welding flat and curved plate to other curved plate which are joined together at various angles of intersection.

More specifically, this invention relates to a device for selectively and fully automatically motivating either a cutting or welding torch respectively adapted to either cut an opening in a flat plate or the side wall of a pipe to receive an intersecting pipe therein, or to thereafter weld said respective members together.

In my Patent No. 2,647,319, issued August 4, 1953, and entitled Pipe Joint Intersector, I have shown means for flame cutting the contour required on the end of a pipe to make an intersection with the side of a second member. My present invention relates to improved means for preparing and welding the second member to the contoured end of the said pipe. To accomplish the foregoing, my present invention is first provided with a cutting torch to prepare the contoured opening adapted to match the contoured end of the pipe. Thereafter, the cutting torch is replaced with a welding torch for joining the two members together. In both operations, however, the principle of my invention is inherent and is practised whether it be a cutting or welding cycle.

I am aware that apparatus is presently known which will perform the operation of cutting a matching contour hole in a member for intersection by a pipe, but such apparatus requires the continuous attention of an operator and frequent manual adjustments of the cutting torch during a cycle of operation. My present invention is the first apparatus which is entirely automatic in this respect, and which when once set and placed into operation needs no attention by an operator during the entire cycle.

Accordingly, it is the principal object of my invention to provide a metal cutting and welding machine which is fully automatic during a cycle of operation.

Other objects of my invention include the provision of a metal cutting and welding machine which will cut an opening of predetermined contour in a member to match the theoretical line of intersection of the member with a pipe, and which will thereafter weld said intersecting members; the provision of a metal cutting machine which will automatically cut a contoured opening in a member adapted to receive an intersecting pipe at any predetermined angle of intersection; the provision of a metal cutting and welding machine which automatically adjusts a metal working tool such as a torch to maintain the zone of the flame in contact with a member as the torch is made to follow a contour on the member defined by the theoretical line of intersection of an intersecting pipe; and the provision of a metal cutting machine which will automatically cut elliptical openings in flat plate and at the same time automatically adjust the flame of the cutting torch to maintain the cutting zone of the flame in contact with the plate at all times.

The features of my invention which I believe to be novel are set forth with particularity in the appended claims. The invention itself, however, both as to its organization and use together with further objects and advantages thereof, may best be understood by reference to the following description taken in connection with the accompanying drawings in which:

Figure 6 is another elevational view of the preferred embodiment of my invention showing the apparatus secured to a pipe workpiece;

Figure 7 is a fragmentary plan view of the means for mounting the ring gear shown in Figures 1 and 2;

Figure 8 is a fragmentary sectional view taken on the line 8—8 of Figure 7;

Figure 1:
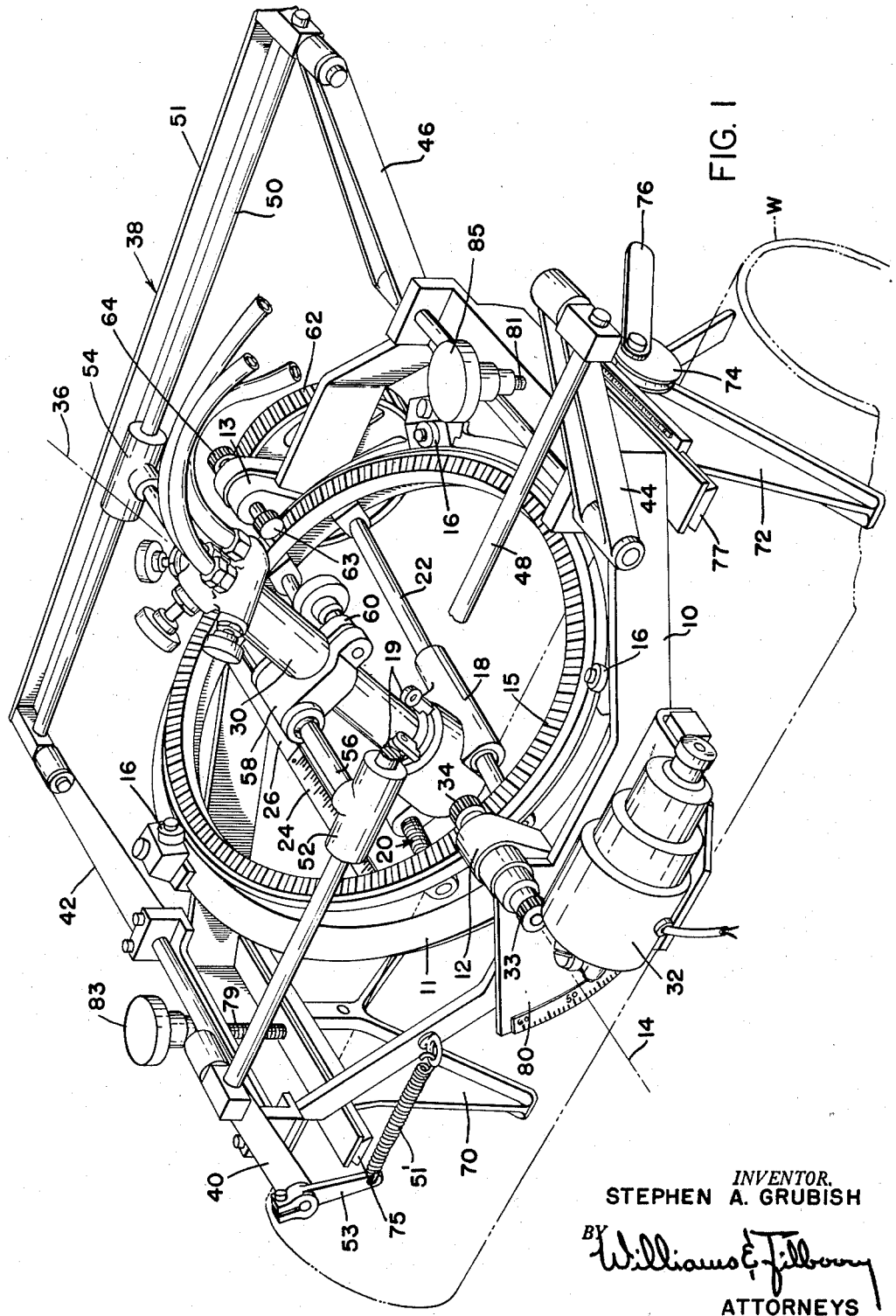
Figure 1 is a perspective view of a preferred embodiment of my invention.

For the purposes of this discussion, a pair of intersecting members will be identified respectively as the intersecting member, and the intersected member. The intersecting member is a curved plate, usually a pipe, which must have its end portion prepared or otherwise formed to a predetermined contour, and the intersected member is a pipe, curved plate, or flat plate which must have an opening therein of the same contour as that of the end portion of the intersecting member. For clarity of exposition, the following discussion has been restricted to considerations with respect to a pair of intersecting pipe, or a plate and an intersecting pipe, it being understood that the discussion is illustrative only and that the principles set forth are equally applicable to other curved surfaces. It is also to be understood that whereas for purposes of illustration a cutting torch is shown in the drawings and discussed hereinafter, my inventive concept embraces broadly both cutting and welding means and either may be used to practice the invention.

It has been the practice in the prior art to cut a hole in a workpiece by means of apparatus similar to that disclosed in the patent to Bucknam, Patent No. 1,049,807, issued January 7, 1913. Bucknam discloses means to mount a cutting torch on a circular carrier including a rotatable ring gear for the purpose of cutting round holes in flat plate. The torch is slidably mounted on a rod or rods positioned to delimit the adjustment of the torch along a major diameter of the ring gear.

In order to cut elliptical holes in flat plate, the Bucknam device must be modified to the extent that the circular carrier is mounted on trunnions for inclination about a horizontal axis, the degree of inclination being a function of the major diameter of the ellipse to be cut. However, in the inclined position the movement of the cutting torch has a vertcal component which must be compensated so as to avoid interference with the plate as the torch is moved downwardly by the ring gear through an inclined circular path. Heretofore, this has been accomplished by manual adjustment of the cutting torch during the cutting cycle.

Thus, whether cutting an ellipse in a flat plate or an opening in the side of a pipe for intersection by a second pipe, two basic components of motion are involved. The first motion is circular and is a function of the radius of the intersecting pipe. The second motion may be described as being a reciprocating motion normal to the plane defined by the circular motion. This reciprocating motion may be described generally as serpentine in form, and in certain applications substantially sinusoidal. These combined motions define the locus of points of intersection between a pipe and a flat plate or a pipe with another pipe.

By way of further illustration, reference is made to Figures 9 through 14, wherein similar parts are identified by like indicia. The figures will be discussed simultaneously.

In order to analyze the movement of a cutting torch employed to cut a hole in a pipe member A or a plate member B (see Figures 9, 11, and 13), a line generatrix G (see Figures 10, 12, and 14), is moved in a circular path P the radius of which is the same as an intersecting pipe C (assuming thin-walled bodies, for purposes of illustration). At the same time, line generatrix G is moved normally to circular path P from position a—a' to position b—b' that amount required for the lower end of generatrix G to follow the surface contour of member A or B from a' to b'. Likewise, generatrix G is moved from position b—b' to c—c', from position c—c' to d—d', and from position d—d' back to position a—a'. In this manner it will be observed that a locus of points L is determined on the surfaces of members A and B which define the line of intersection between member C and member A, or member C and member B.

In brief summation, a metal working tool such as a cutting or welding torch requires both circular and reciprocating components of motion, as defined hereinabove, to cut an opening in a plate or side of a pipe for intersection by a second pipe, or for welding thereafter. It is the guiding principle of my invention to combine in one machine the two motions required to automatically guide a cutting torch, for instance, while cutting an opening in a workpiece shaped to receive an intersecting workpiece. It is my inventive concept, therefore, to combine with an annular member rotatably mounted on a frame, and having a radially adjustable metal working tool guide secured thereto, a second metal working tool guide mounted on the frame and adapted to track the movement of the first guide. I further provide means to reciprocate the second guide in a path normal to the circular path described by the first guide when the annular member is rotated. The movements of the two guides are predetermined to impart to a metal working tool, suitably held by said guides, a resultant path of movement which approximates a line of intersection between two workpieces.

The means embodying my inventive concept for imparting this entirely automatic movement to a metal working tool, such as either a cutting or welding implement, will now be particularly described with reference to the drawings in greater detail.

Figure 2:
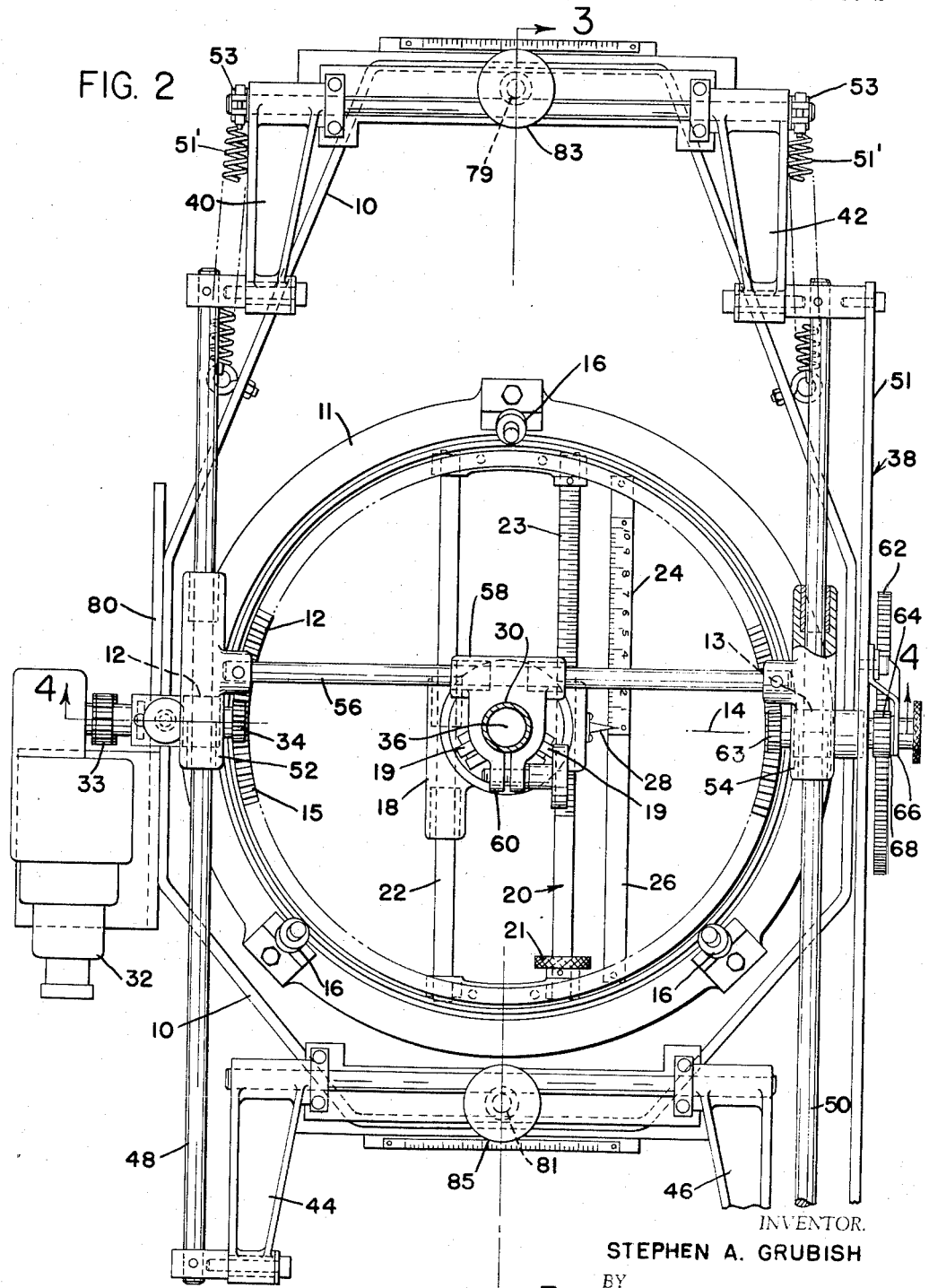
Figure 2 is a top plan view of the preferred embodiment of my invention shown in Figure 1, but with the ring gear indexed 90° from its position shown in Figure 1, and with the torch member set at the center of rotation of the ring gear.
Figure 3:
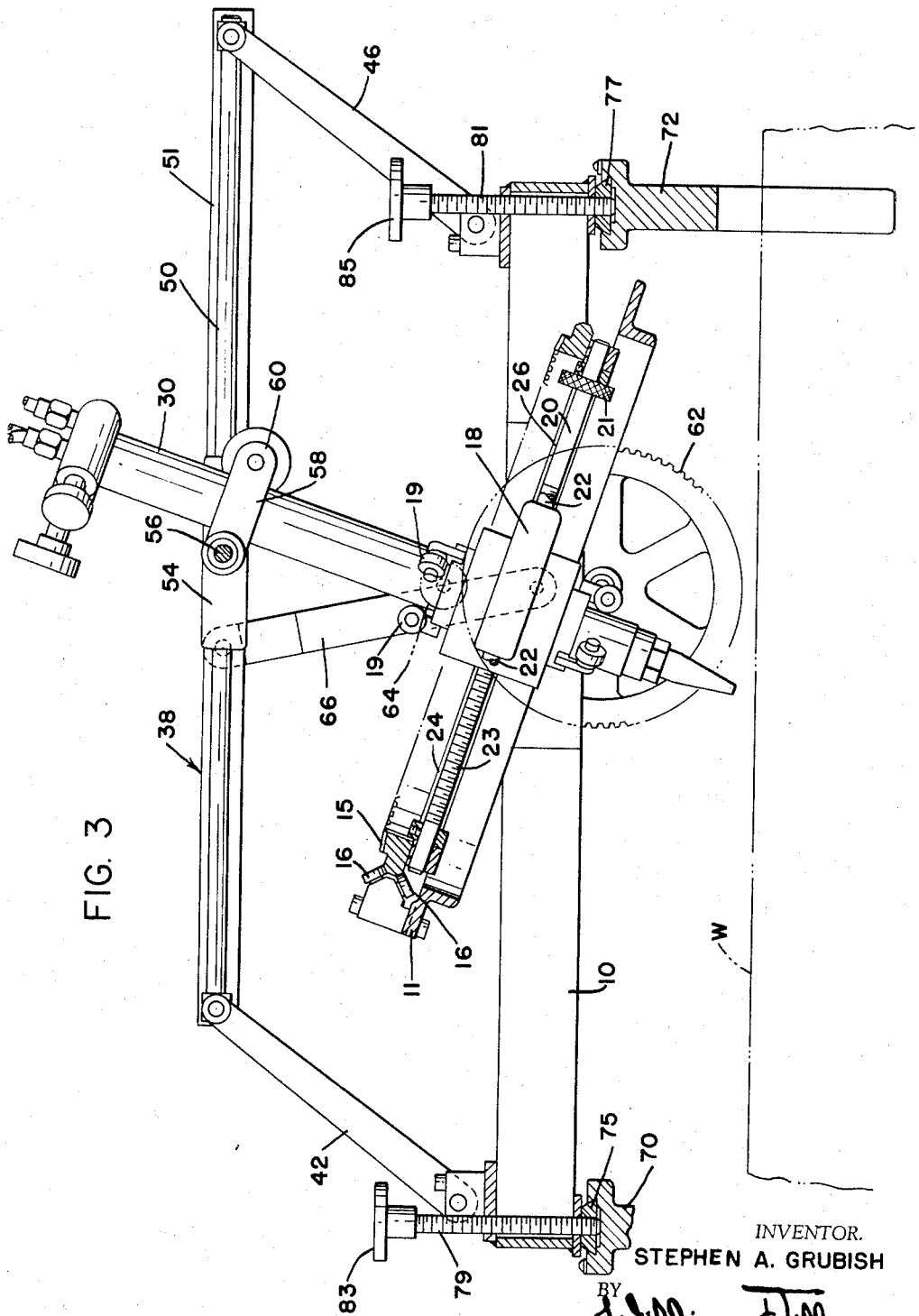
Figure 3 is a sectional view of the preferred embodiment of my invention taken substantially along the line 3—3 of Figure 2, but with the circular carrier inclined to the horizontal.
Figure 4:
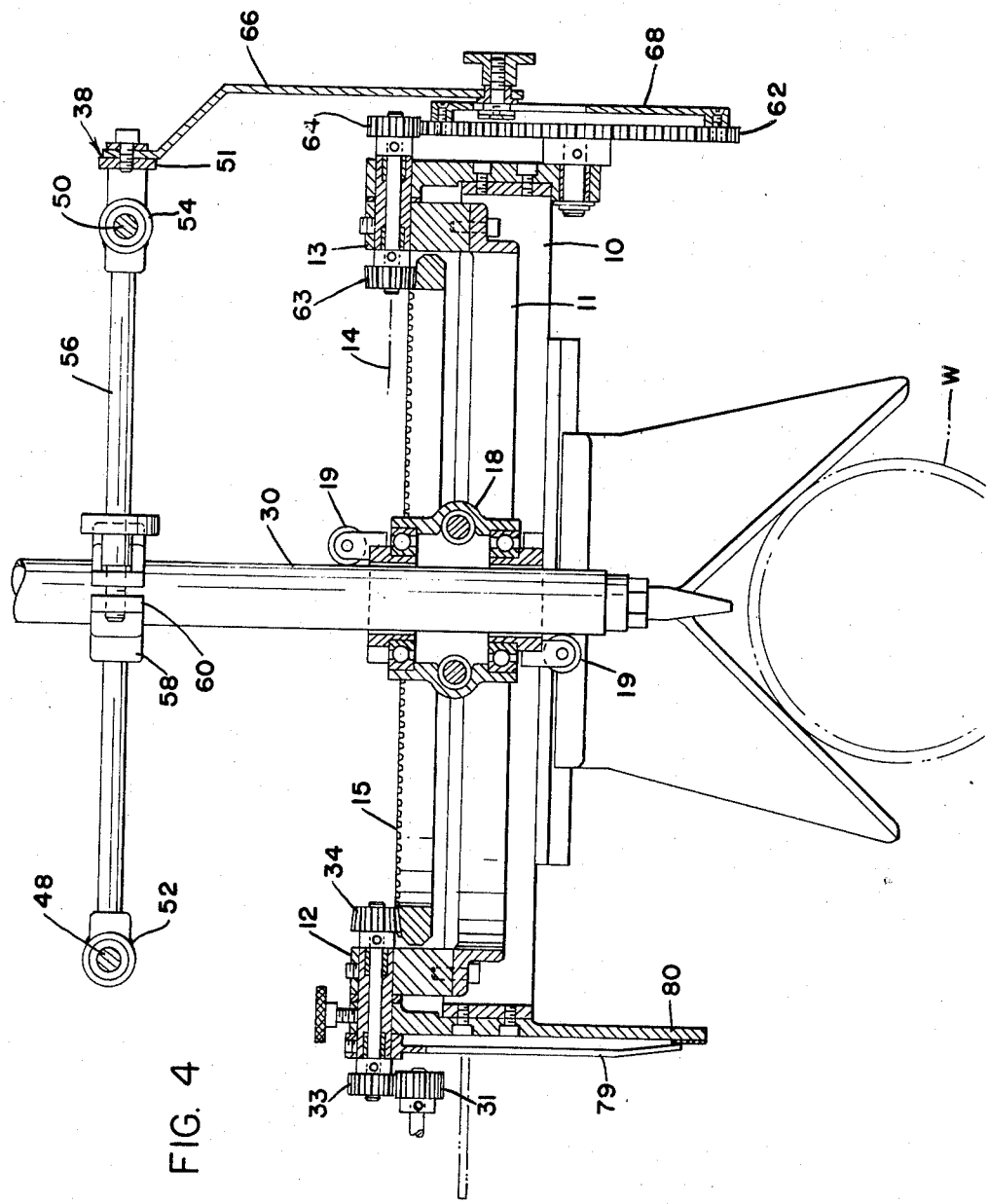
Figure 4 is a sectional view of the preferred embodiment of my invention taken along line 4—4 of Figure 2.

Referring now to Figure 1, a preferred embodiment of my invention comprises a supporting structure or frame 10, a circular carrier 11 mounted on trunnions 12 and 13 to pivot on the frame 10 about horizontal axis 14, and a ring gear 15 rotatably mounted on circular carrier 11 by means of pairs of rollers 16 (see also Figures 7 and 8). A metal working tool guide comprising a crosshead 18 is slidably mounted on a pair of tracks 20 and 22 for radial adjustment relative to the axis of rotation of the ring gear 15 by means of knurled knob 21 and screw portion 23. A scale 24 (see also Figure 2) provided on cross member 26, and pointer 28 on crosshead 18 are provided to gage the radial adjustment of the crosshead. A metal working tool such as a cutting torch 30 is adapted to slidably fit within the crosshead 18, and rollers 19 are mounted on crosshead 18 to position and slidably guide the cutting torch 30 normal to the plane of the circular carrier. A small variable speed motor 32 is mounted on the supporting structure 10 and a pinion 34 in engagement with the ring gear 15 of the circular carrier 11 is adapted to be driven by said motor through intermediate pinions 31 and 33 (see Figure 4), whereby the ring gear is rotated about its axis 36 normal to the plane of the circular carrier.

A super-structure frame component 38 is pivotally secured to the supporting structure 10 and comprises pairs of link members 40 and 42, and 44 and 46, pivotally secured at their lower ends to the supporting structure 10 and on opposite sides thereof. The upper ends of link members 40 and 44 are pivotally secured to a transverse drag bar 48, and the upper ends of link members 42 and 46 ar similarly pivotally secured to a drag bar 50 parallel to drag bar 48. Thus in effect, the structure described forms a skeleton parallelepipedon the link members of which are shiftable through arcuate paths. Inasmuch as the link members uniformly incline to the vertical, springs 51' and levers 53, connected between links 40, 42 and frame 10, serve as a counter-balance.

A pair of sleeves 52 and 54 are slidably fitted on drag bars 48 and 50 respectively, and are connected one to the other by cross member 56 upon which is slidably attached a crosshead 58. The crosshead 58 includes a split collar portion 60 adapted to rigidly clamp the upper end of the cutting torch 30. It will be apparent therefore that transverse movement of the crosshead 58 on the cross member 56 in combination with longitudinal movement of the slidable sleeves 52 and 54 on drag bars 48 and 50 serves to provide the crosshead 58 with a universal movement in any given plane.

Figure 5:
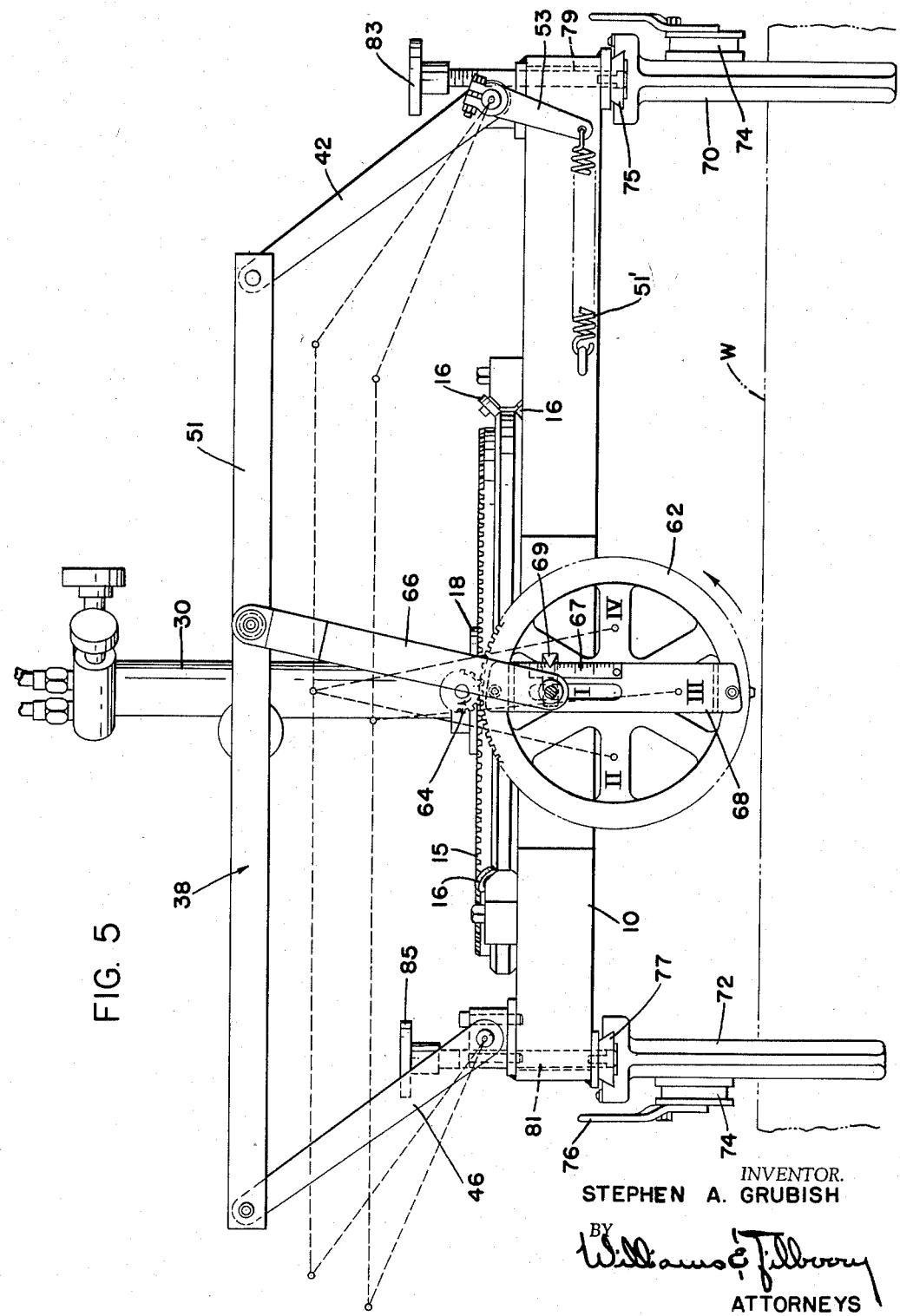
Figure 5 is a side elevational view of the preferred embodiment of my invention.
Figure 9:
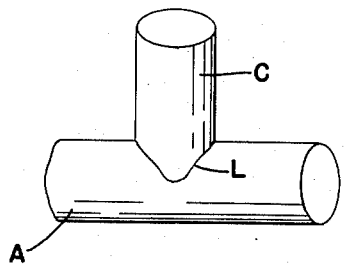
Figure 9 is a perspective view of a pair of pipes intersecting at right angles.
Figure 10:
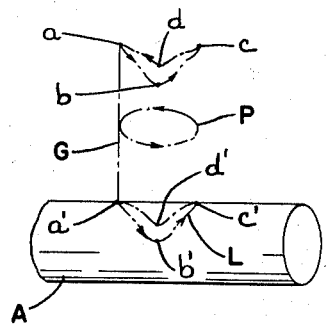
Figure 10 is a schematic representation of the path of movement of a line generatrix corresponding to the necessary movement of a cutting torch in order to cut an opening of proper contour in an intersected pipe to receive an intersecting pipe therein.
Figure 11:
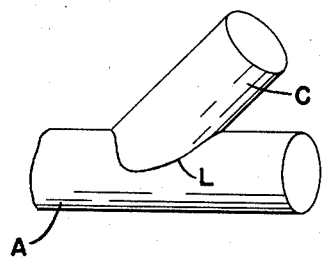
Figure 11 is a perspective view of a pair of pipes intersecting at other than a right angle.
Figure 12:
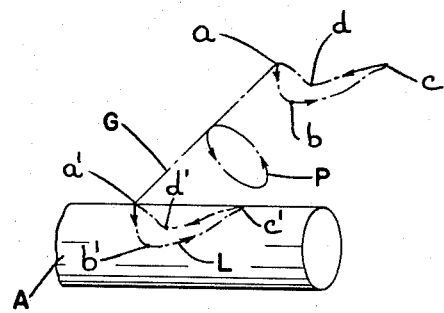
Figure 12 is a schematic representation of the path of movement of a line generatrix corresponding to the path of movement required by a cutting torch to cut an opening of proper contour in an intersected pipe to receive an intersecting pipe therein.
Figure 13:
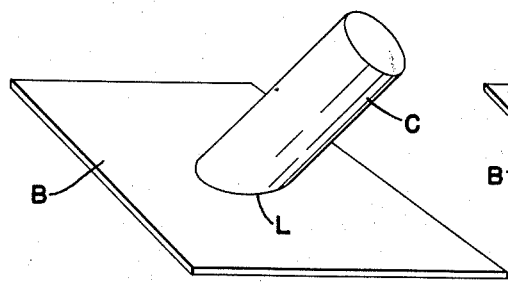
Figure 13 is a perspective view of a pipe and a flat plate intersecting at other than a right angle; and, Figure 14 is a schematic representation of the path of movement of a line generatrix corresponding to the path of movement of a cutting torch required to cut an elliptical opening in a flat plate adapted to receive an intersecting pipe therein.
Figure 14:
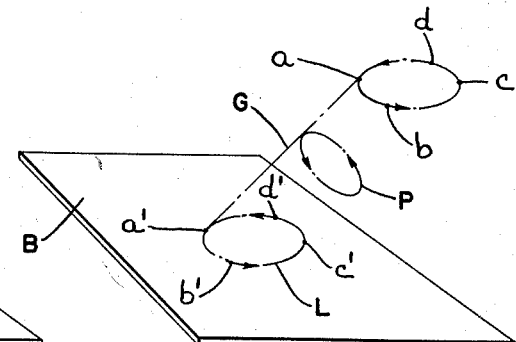

A side gear 62 (see Figure 5) is mounted on the side of the supporting member 10 to rotate in a vertical plane, and is drivingly connected to the ring gear 15 by means of pinions 63 and 64, which function in the nature of a power take off from the ring gear 15. A connecting rod 66 is eccentrically secured at its lower end to the side gear 62 and to drag bar 51 at its upper end. The lower end of connecting rod 66 is radially adjustable with respect to side gear 62 on a cross member 68 secured to the side gear. The diameter of the side gear 62 is selected so as to be in a 1:2 ratio with the ring gear 15, whereby the side gear will make two revolutions driven by pinion 64 for each revolution made by the ring gear 15 driven by pinion 34. Thus it will be seen from viewing Figure 5 that when connecting rod 66 is eccentrically adjusted on side gear 62, the interconnected drag bars 48 and 50 will be driven by the connecting rod through two cycles of reciprocating movement for each revolution of ring gear 15. With connecting rod 66 adjusted to zero eccentricity, the drag bars 48 and 50 will be maintained in the same horizontal plane throughout the rotary cycle of movement of side gear 62.

A pair of V-block type locating members 70 and 72 (see Figures 5 and 6) serve as legs when cutting flat stock, and the crotches of these members center-position the apparatus to rest on a pipe workpiece W when making a cut on the pipe curved surface. Each locating member is dove-tailed with plates 75 and 77 for lateral adjustment of frame 10. By shifting frame 10 laterally with respect to locating members 70 and 72, off-center holes may be cut in the intersected pipe workpiece W. The frame 10 is locked in position by clamping screws 79 and 81 provided with hand knobs or grips 83 and 85. Inasmuch as offset cutting and welding does not constitute a part of the subject invention, no further discussion of this technique is set forth hereinafter.

A cam 74 secured to each end of frame 10 is grooved to receive a chain 87 therein (see Figure 6) and to pass about the circumference of the pipe W so that the pipe and the apparatus may be clamped securely together upon rotation of the cam lever 76 to the left, or counterclockwise.

*Operation*

To operate my apparatus, the lower end of a metal working tool such as a cutting torch 30 is inserted in crosshead 18. Rollers 19 contact the side wall of torch 30 and permit sliding movement between the torch and the crosshead. The upper end of torch 30 is inserted in crosshead 58 and securely clamped therein by split collar 60. The scale 24, as aforesaid, is provided for facility in setting the radial adjustment of the torch for a given size pipe opening to be cut in the intersected pipe. Thus for instance, if an intersected pipe is ten inches in diameter, the crosshead 18 may be adjusted to cut an intersection for an intersecting pipe of any size up to ten inches in diameter. Assuming that it is required to cut an opening in a ten inch pipe for intersection by a five inch pipe, the pointer 28 will then be moved to the numeral five on the scale 24 which will correspondingly offset the lower and upper crossheads 18 and 60 a like amount. If the intersection is to be at right angles, then the circular carrier 11 is maintained in a horizontal attitude. However, if the intersection is to be at some angle other than 90°, the circular carrier is inclined to the horizontal the desired amount. The inclination may be noted by the pointer 79 of the inclinometer 80 mounted on the side of the supporting frame opposite to the side gear 62 (see Figures 1 and 4). The eccentricity of connecting rod 66 is also appropriately adjusted by means of scale 67 and pointer 69 which are calibrated to give direct settings in terms of intersecting pipe diameters (see Figure 5).

With the side gear 62 and connecting rod 66 properly synchronized for movement with the ring gear 15, in order to start a cut in a pipe on the center line of the pipe, ring gear 15 is jogged until the connecting rod 66 is at top dead center, thereby elevating the drag bars 48 and 50 to their highest position. The cutting torch 30 is ignited, after an initial spacing of the torch with respect to the pipe is made, and thereafter motor 32 is started.

Rotation of motor 32 turns pinion 34 to drive ring gear 15 and carry the cutting torch 30 in a circular path. At the same time, as the cutting torch moves away from the center line of the pipe, eccentric connecting rod 66 moves off dead center (Figure 5, position I), and downwardly drawing the drag bars 48 and 50 downwardly with it (see Figure 5, position II). This movement of the drag bars 48 and 50 lowers the upper crosshead 58 and causes the cutting torch 30 to slide downwardly within the lower crosshead 18. The movement continues until the cutting torch 30 has progressed 90° from its starting point which was the high point on the center line of the pipe. At the same time, due to the 1:2 ratio between the side gear 62 and the ring gear 15, the eccentric connecting rod 66 has progressed from top dead center to bottom dead center, or 180° from its starting point (see Figure 5, position III). As the cutting torch 30 continues in its circular movement (see Figure 5, position IV), eccentric connecting rod 66 begins to once more elevate the frame members, comprising drag bars 48, 50 and 51 and cross member 56 until the drag bars once again reach top dead center. At this time the cutting torch 30 is again on the high point of the pipe at the pipe center line. Thereafter, the eccentric connecting rod 66 starts a second cycle to lower the frame component 38 as the cutting torch 30 enters the third quadrant of its circular movement. When the cutting torch 30 reaches the 270° position on the circular carrier 11, the eccentric connecting rod 66 is again at bottom dead center (position III), thereby permitting the cutting torch 30 to extend downwardly for the second time to the lowest depth of the cut in the pipe. As the torch 30 enters into the fourth quadrant of movement relative to the circular carrier 11, the eccentric connecting rod 66 starts on its second upward path through position IV to elevate the frame component 38. As the connecting rod 66 for the second time reaches top dead center the cutting torch 30 has completed a full circle and is back at its starting point.

During the course of the movement of the cutting torch 30 the vertical component of movement, imparted to the torch by the lowering and raising of the frame component 38, has continuously maintained the cutting zone of the flame of the torch 30 in contact with the contour of the pipe. Thus an opening is cut in the pipe which establishes the intersection between this pipe and an intersecting pipe of the diameter predetermined by the setting of the torch 30 and the connecting rod 66 with respect to scales 24 and 67 respectively.

If the intersecting pipe is to meet with the intersected pipe at an angle, the circular carrier 11 is inclined the number of degrees required as indicated on the inclinometer 80 (see Figures 1 and 4) and locked in this position. The cycle is then repeated substantially as set forth hereinabove.

For cutting elliptical holes in flat plate, the eccentricity of the connecting rod 66 is set at zero to maintain the frame component 38 constantly at the same elevation. The circular carrier 11 is then inclined depending on the size of ellipse to be cut. The minor diameter of the ellipse is determined by the setting of the lower crosshead 18 on the circular carrier 11, and the major diameter is the function of the inclination of the circular carrier 11 with the horizontal. With the apparatus adjusted for proper major and minor axes, the cutting torch 30 is pre-spaced at a proper distance from the plate, and the motor is then started. As the ring gear 15 revolves carrying the cutting torch 30 with it, the frame component 38 holds the torch lower tip in one horizontal plane so that no interference can occur between the cutting torch and the plate workpiece.

From the foregoing, it will be seen that my invention provides a cutting and welding device which is suitable for fully automatic operation in a novel and improved manner. It is to be understood that the embodiment of the invention shown herein is by way of example only and is not intended to be construed in a limiting sense. It is believed that the foregoing discussion and illustrations enable those skilled in the art to practice the invention; that other arrangements and modifications will occur to those guided by the teaching of this invention; and that these other arrangements may be resorted to without departing from the scope of the invention.

I claim:

1. In a metal cutting and welding machine having a supporting structure, a circular carrier mounted on said supporting structure, an annular member carried by and rotatable on said circular carrier, means for rotating said annular member, a metal working tool, and a first tool guide means secured to said annular member and adapted to describe a predeterminable circular path, the improvement comprising: a second tool guide means; a bracket pivotally secured to said supporting structure for arcuate reciprocating movement adapted to carry and permit universal movement by said second tool guide means, said metal working tool being slidingly fixed to said first tool guide means and rigidly fixed to said second tool guide means; adjustable rotatable eccentric means connected to said supporting structure and to said bracket adapted to impart arcuate reciprocating movement to said bracket, whereby said metal working tool generates a complex curve which is the function of the combined motions of said first tool guide means and said bracket.

2. In a metal cutting and welding machine having a supporting structure, a circular carrier mounted on said supporting structure, an annular member carried by and rotatable on said circular carrier, means for rotating said annular member, a metal working tool, and a first tool guide means secured to said annular member and adapted to describe a predeterminable circular path, the improvement comprising: a bracket pivotally secured to said supporting structure for arcuate reciprocating movement, a second tool guide means mounted on said bracket for universal movement thereon, said metal working tool being slidingly fixed to said first tool guide means and rigidly fixed to said second tool guide means; an eccentric mounted on said supporting structure and rotatably driven by said means to rotate said annular member; and linkage drivingly connecting said eccentric to said bracket, whereby said metal working tool generates a complex curve which is the function of the combined motions of said first tool guide means and said bracket.

3. In a metal cutting and welding machine having a supporting structure, a circular carrier mounted on said supporting structure, an annular member carried by and rotatable on said circular carrier, means for rotating said annular member, a metal working tool, and a first tool guide means secured to said annular member and adapted to describe a predeterminable circular path, the improvement comprising: a bracket pivotally secured to said supporting structure for arcuate reciprocating movement; a second tool guide means mounted on said bracket for transverse and longitudinal movement relative to said bracket; an adjustable rotatable eccentric synchronized to rotate with said annular member; and connecting means between said eccentric and said bracket adapted to pivotally and arcuately reciprocate said bracket; said metal working tool being slidingly secured to said first tool guide means and rigidly secured to said second tool guide means, whereby said second tool guide means will track the circular movement of said first tool guide means and the component of motion of said bracket normal to the circular movement of said first tool guide means.

4. In a pipe cutting and welding machine having a supporting structure, a circular carrier mounted on said supporting structure, an annular member carried by and rotatable on said circular carrier, means for rotating said annular member, metal working tool, and a first tool guide means adjustably secured to said annular member for movement therewith, the improvement comprising: a bracket pivotally secured to said supporting structure for arcuate reciprocating movement; a second tool guide means mounted on said bracket for transverse and longitudinal movement relative to said bracket; rotatable eccentric means having an adjustable throw secured to said supporting structure and synchronized to make two revolutions for each revolution of said annular member; and connecting means between said eccentric means and said bracket adapted to arcuately reciprocate said bracket; said metal working tool being slidingly secured to said first tool guide means and rigidly secured to said second tool guide means, whereby the movement imparted to said metal working tool is the function of the combined movements of said first tool guide means and said second tool guide means, said movement approximating the intersection of pipes the sizes of which are predetermined by the setting of said eccentric and the adjustable securing means of said first tool guide means.

5. The pipe cutting machine set forth in claim 4 wherein said bracket includes a pair of parallel, horizontally disposed tracks; connecting links pivotally secured to said tracks and to said supporting structure; a track transverse to said pair of tracks and slidable thereon; and a crosshead slidably secured to said transverse track and adapted to carry said second tool guide means.

6. In a pipe cutting and welding machine having a supporting structure, a circular carrier mounted on said supporting structure, a first ring gear member carried by and rotatable on said circular carrier; means for rotating said ring gear member, a metal working tool, and a first tool guide means adjustably secured to said ring gear member for movement therewith, the improvement comprising: a superstructure pivotally mounted on said supporting structure for arcuate reciprocating movement, said superstructure including a pair of horizontally disposed guide bars; a pair of parallel aligned connecting links pivotally secured to the opposite ends of each guide bar and to opposite sides of said supporting structure; a cross bar secured transversely to said pair of guide bars and slidable in the plane of and parallel to the longitudinal axes of said guide bars; a crosshead slidably secured to said cross bar; a second tool guide secured to said crosshead; a second ring gear member mounted on said carrier normal to said first ring member; drive means connecting said first and second ring gear members; said second ring gear having a diameter ratio to said first ring gear whereby said second ring gear makes two revolutions for each revolution of said first ring gear; adjustable eccentric means secured to said second ring gear; and connecting means between said eccentric means and said superstructure adapted to arcuately pivot said superstructure on said supporting structure; said metal working tool being slidingly secured to said first tool guide means and rigidly secured to said second tool guide means whereby the movement imparted to said metal working tool is the function of the combined movement of said first and second tool guide means, said movement approximating the intersection of pipes the sizes of which determine the adjustment of said first tool guide means and said eccentric means.

References Cited in the file of this patent

UNITED STATES PATENTS

| | | |
|---|---|---|
| 1,176,584 | Madgett | Mar. 21, 1916 |
| 1,907,956 | Gerber | May 9, 1933 |
| 2,545,666 | Lonngren | Mar. 20, 1951 |
| 2,623,742 | Livesay | Dec. 30, 1952 |